United States Patent [19]

Hannah

[11] Patent Number: 5,678,210
[45] Date of Patent: Oct. 14, 1997

[54] METHOD AND APPARATUS OF COUPLING A TRANSMITTER TO A WAVEGUIDE IN A REMOTE GROUND TERMINAL

[75] Inventor: Robert Hannah, Germantown, Md.

[73] Assignee: Hughes Electronics, Los Angeles, Calif.

[21] Appl. No.: 406,228

[22] Filed: Mar. 17, 1995

[51] Int. Cl.⁶ .................................................... H04B 1/03
[52] U.S. Cl. ........................ 455/128; 455/81; 455/129; 333/26
[58] Field of Search .......................... 455/81, 128, 129; 333/26

[56] References Cited

U.S. PATENT DOCUMENTS

| 4,679,249 | 7/1987 | Tanaka et al. | 333/26 |
| 4,837,527 | 6/1989 | Nakamura | 333/26 |
| 5,305,000 | 4/1994 | Harris | 333/26 |

FOREIGN PATENT DOCUMENTS

| 1-268301 | 10/1989 | Japan | 333/26 |

*Primary Examiner*—Chi H. Pham
*Attorney, Agent, or Firm*—John T. Whelan; Wanda Denson-Low

[57] ABSTRACT

A remote ground terminal for transmitting a modulated data signal to a satellite. The remote ground terminal includes an outdoor unit comprising an input port for receiving a modulated data signal, a housing having an upper portion and a lower portion which comprises a waveguide. The outdoor unit further comprises a transmitter module for amplifying and multiplying the modulated data signal so as to produce the modulated carrier signal. The transmitter is mounted in the lower portion of the housing so as to be positioned above at least a portion of the waveguide. The outdoor unit also comprises a probe having a first and second end, with the first end being disposed in the transmitter module. The probe receives the modulated carrier signal generated by the transmitter module. The second end of the probe extends from a lower surface of the transmitter module into the waveguide. The probe is operative to couple the modulated carrier signal directly into the waveguide disposed in the lower portion of the housing. The modulated data signal is then coupled to an antenna coupled to the output of the waveguide via a feedhorn, and transmitted to the satellite.

18 Claims, 6 Drawing Sheets

METHOD AND APPARATUS OF COUPLING A TRANSMITTER TO A WAVEGUIDE IN A REMOTE GROUND TERMINAL

BACKGROUND OF THE INVENTION

Satellite communication systems typically have employed large aperture antennas and high power transmitters for establishing an uplink to the satellite. Recently, however, very small aperture antenna ground terminals, referred to as remote ground terminals, have been developed for data transmission at low rates. In such systems, the remote ground terminals are utilized for communicating via a satellite from a remote location to a central hub station. The central hub station communicates with multiple remote ground terminals, and has a significantly larger antenna, as well as a significantly larger power output capability than any of the remote ground terminals.

Very small aperture terminal (VSAT) remote terminals can be used to communicate data, voice and video, to or from a remote site to a central hub. Typically, the VSAT remote terminals have a small aperture directional antenna for receiving from or transmitting signals to a satellite, and an outdoor unit (ODU) mounted near the antenna for transmitting a modulated carrier generated by an indoor unit (IDU). The IDU demodulates incoming signals received from the ODU and also operates as an interface between a user's communication equipment and the ODU.

The outdoor unit functions in part as an interface between the indoor unit and the antenna. As such, it contains a transmitter chain for transmitting the modulated carrier signal in accordance with data signals received from the indoor unit and a receiver chain for coupling signals received via the antenna to the indoor unit. Both the transmitter and receiver chains comprise discrete modules which are interconnected, as required, by various cables and connectors.

For example, prior art outdoor units utilized a cable to couple the output of a transmitter module to a waveguide, which is also coupled to the antenna. However, such an interface necessitates the output signal traverse two additional connectors, one at the output of the transmitter module and one at the input to the waveguide. Accordingly, the signal output by the transmitter module is attenuated prior to entering the waveguide due to the power losses associated with the standing wave ratio loss created by the additional connectors and cable. As a result, the transmitter module must provide an output signal having increased output power levels so as to compensate for these additional losses. Furthermore, this technique requires the use of additional connectors and cables. Both the foregoing requirements operate to increase the cost of the outdoor unit.

As the viability of the remote ground terminal concept increases as the cost for providing a remote ground terminal at the remote location decreases, it is necessary to decrease the cost of all components of the remote ground terminal as much as possible.

Accordingly, in order to minimize the power level of the signal produced by the transmitter module, there exists a need for an outdoor unit which minimizes the transmission losses incurred in coupling the output of the transmitter module to the antenna, and which minimizes the number of components required to couple the transmitter module to the antenna.

SUMMARY OF THE INVENTION

The present invention provides an outdoor unit of a remote ground terminal designed to satisfy the aforementioned needs. Specifically, the present invention provides a novel design for coupling the output of the transmitter module to a waveguide that is simple, eliminates the need for additional connectors or cables, and minimizes the transmission loss associated with transferring a signal output by the transmitter module to the waveguide so as to substantially reduce the overall cost of the remote ground terminal relative to prior art designs.

Accordingly, the present invention relates to an apparatus for transmitting a modulated carrier signal to a satellite. In one embodiment, the apparatus comprises an input port for receiving a modulated data signal, a housing having an upper portion and a lower portion which comprises a waveguide. The apparatus further comprises a transmitter module for amplifying and multiplying the modulated data signal so as to produce the modulated carrier signal. The transmitter module is mounted in the lower portion of the housing so as to be positioned above at least a portion of the waveguide. The apparatus of the present invention also comprises a probe having a first and second end, with the first end being disposed in the transmitter module. The probe receives the modulated carrier signal generated by the transmitter module. The second end of the probe extends from a lower surface of the transmitter module into the waveguide. The probe is operative to couple the modulated carrier signal directly into the waveguide disposed in the lower portion of the housing. The modulated data signal is then coupled to an antenna via a feedhorn coupled to the output of the waveguide, and transmitted to the satellite.

As described below, the apparatus of the present invention provides important advantages. For example, the present invention eliminates the need for an additional cable to connect the transmitter module with the waveguide coupled to the transmitting antenna. This minimizes the power losses associated with coupling the output of the transmitter module to the waveguide. As a result, the power rating of the amplifier of the transmitter module can be reduced thereby reducing the cost of the module. The present invention also eliminates the cost associated with the additional cable and the connectors, thereby further reducing the cost of the outdoor unit.

Another advantage is that the transmitter module mounts flush with a surface which is integral with heat dissipating elements of the outdoor unit, thereby increasing the efficiency of the heat dissipation of the outdoor unit.

The invention itself, together with further objects and attendant advantages, will best be understood by reference to the following detailed description, taken in conjunction with the accompanying drawings.

DETAILED DESCRIPTION OF THE DRAWINGS

Figure 1:
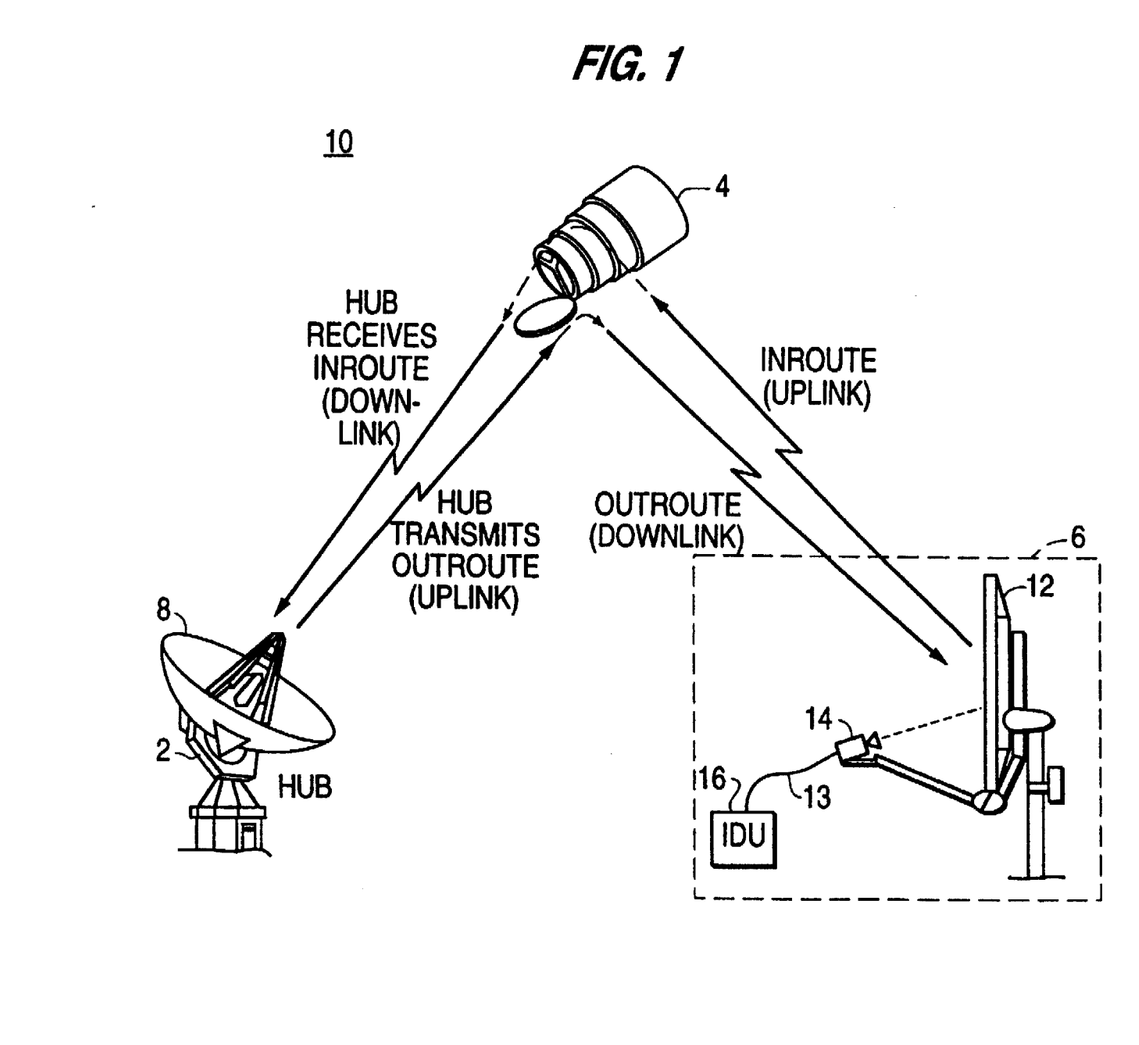
FIG. 1 is a block diagram of a very small aperture terminal ("VSAT") satellite communication network which utilizes the present invention.

The VSAT satellite communication network 10 illustrated in FIG. 1, comprises a central hub station 2, a communication satellite 4, and a plurality of remote ground terminals 6 (only one is shown). The VSAT network 10 functions as a two way transmission system for transferring data and voice communications between the central hub station 2 and the numerous remote ground terminals 6. All data is transferred between the central hub station 2 and the remote ground terminals 6 via transponders located in the satellite 4. Signals transmitted from the central hub station 2 to the remote ground terminal 6 are referred to as "outroute", while signals transmitted in the opposite direction are referred to as "inroute".

The remote ground terminal 6 comprises a small aperture antenna 12 for receiving (i.e., downlink) and transmitting (i.e., uplink) signals, an outdoor unit 14 typically mounted proximate the antenna 12 which comprises a transmitter module for amplifying and frequency multiplying a modulated data signal which is coupled to the antenna 12 via a feedhorn 27, and an indoor unit 16 which operates as an interface between a specific user's communication equipment and the outdoor unit 14. The indoor unit 16 also generates the modulated data signal which is amplified and frequency multiplied by the transmitter module of the outdoor unit.

The present invention provides an outdoor unit 14 which eliminates the need for connectors and cables to couple the output of a transmitter module 20 to a waveguide 21 which is coupled to the antenna 12. As a result, the present invention minimizes the transmission losses incurred in coupling the output of the transmitter module 20 to the waveguide 21. The reduction of transmission losses allows for a reduction in the output power requirements of the transmitter module 20, which results in a substantial reduction in the cost of the transmitter module 20.

Figure 2:
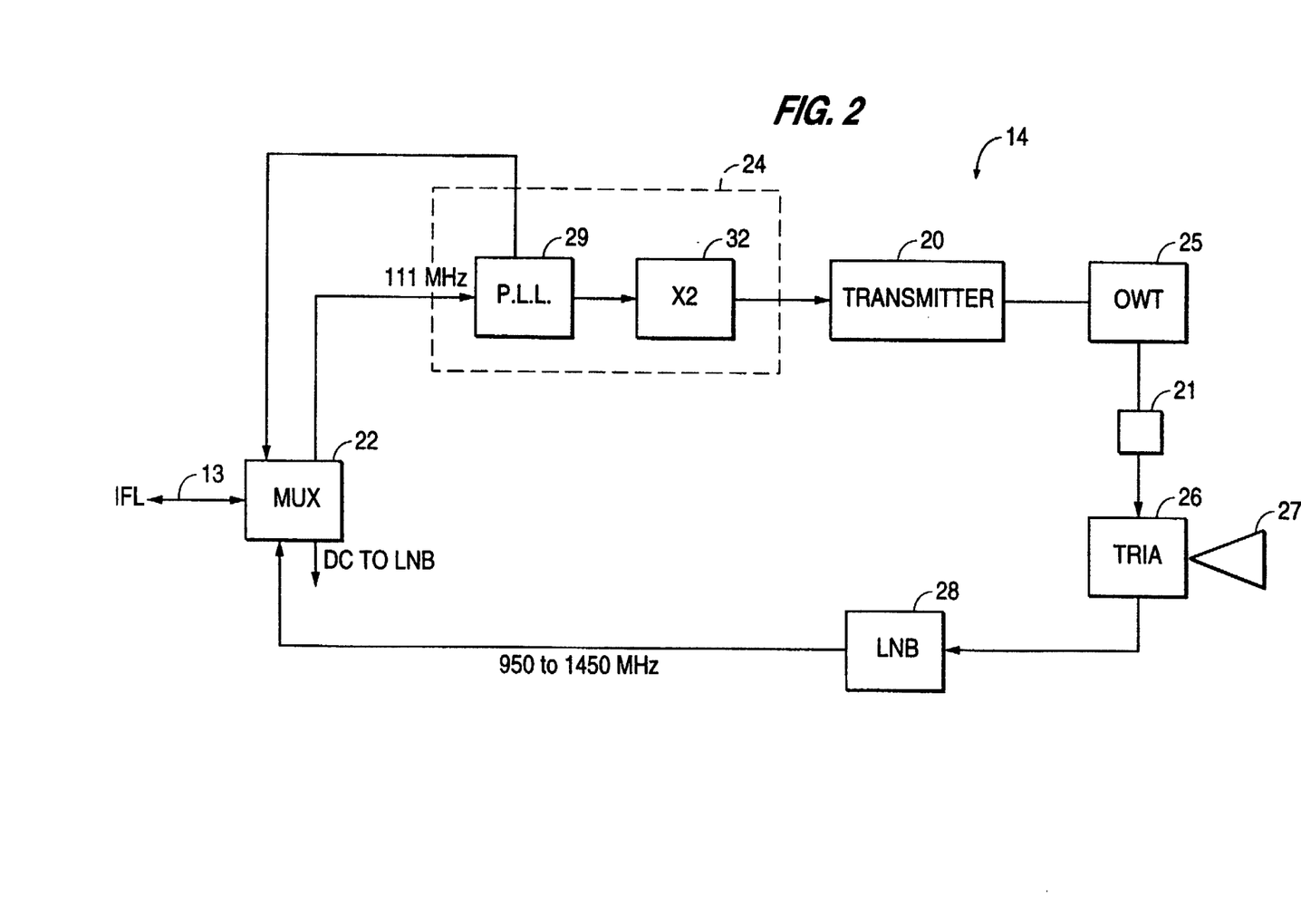
FIG. 2 is a block diagram illustrating one embodiment of the outdoor unit of the present invention.

FIG. 2 is a block diagram of the outdoor unit 14 of the present invention. A shown in FIG. 2, the outdoor unit 14 of the present invention comprises a multiplexer 22 for receiving the modulated data signal from the indoor unit 16, a main transmit module 24, which includes a phase-locked loop 29 and a frequency multiplier 32 for frequency stabilizing and multiplying the modulated data signal, a transmitter module 20 for amplifying and frequency multiplying the modulated data signal to generate a modulated carrier signal, and an orthogonal waveguide transition ("OWT") 25 which couples the output of the transmitter module 20 to a transmit receive isolation assembly ("TRIA") 26. The output of the TRIA assembly 26 is coupled to the antenna 12 via a feedhorn 27. The antenna 12 then transmits the modulated carrier signal to the satellite 4.

The outdoor unit 14 also comprises a receiver chain for receiving the downlink signal from the satellite 4. The receiver chain comprises a low noise block downconverter 28 which transforms the received signal into a corresponding intermediate frequency signal. This signal is then coupled to the indoor unit 16, where it is further demodulated so as recreate the transmitted data.

Figure 3:
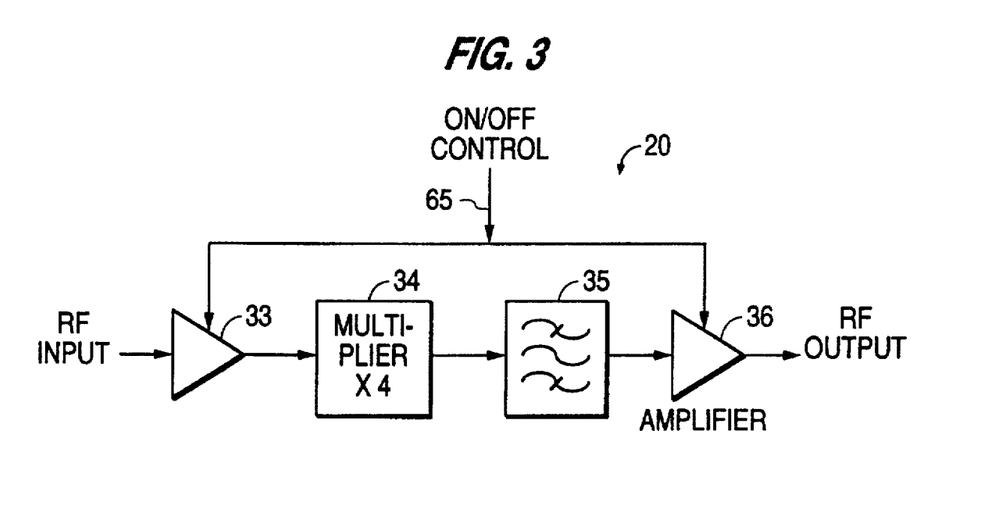
FIG. 3 is a block diagram illustrating the components of one embodiment of the transmitter module of the present invention.

As stated, the input of the transmitter module 20 is coupled to the output of the frequency multiplier 32 of the main transmit module 24. The transmitter module 20 functions to amplify and frequency multiply the signal output by the frequency multiplier 32 so as to produce a modulated carrier frequency suitable for transmission to the satellite 4. As shown in FIG. 3, in one embodiment, the transmitter module 20 comprises an input buffer 33, a frequency multiplier 34 which multiplies the second intermediate frequency by a factor of 4, a bandpass filter 35 tuned to the frequency of the carrier signal and an amplifier 36 for amplifying the output of the frequency multiplier 34 of the transmitter module 20, which are all coupled in a series configuration.

Figure 4:
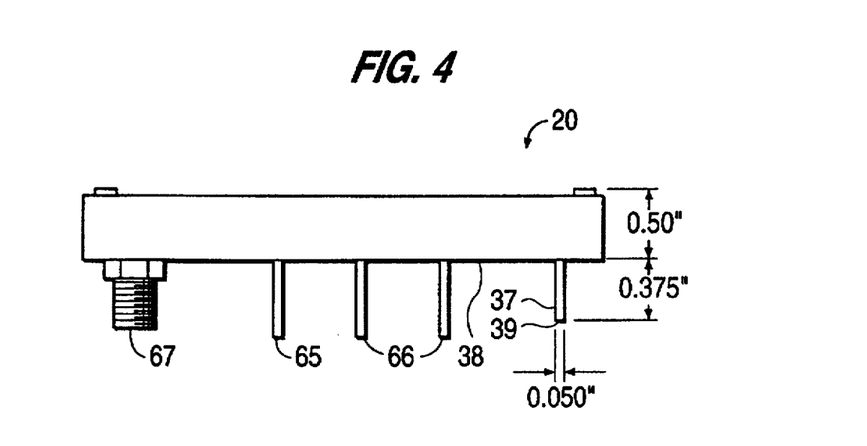
FIG. 4 is a drawing illustrating the physical dimensions of one embodiment of the transmitter module of the present invention.
Figure 7:
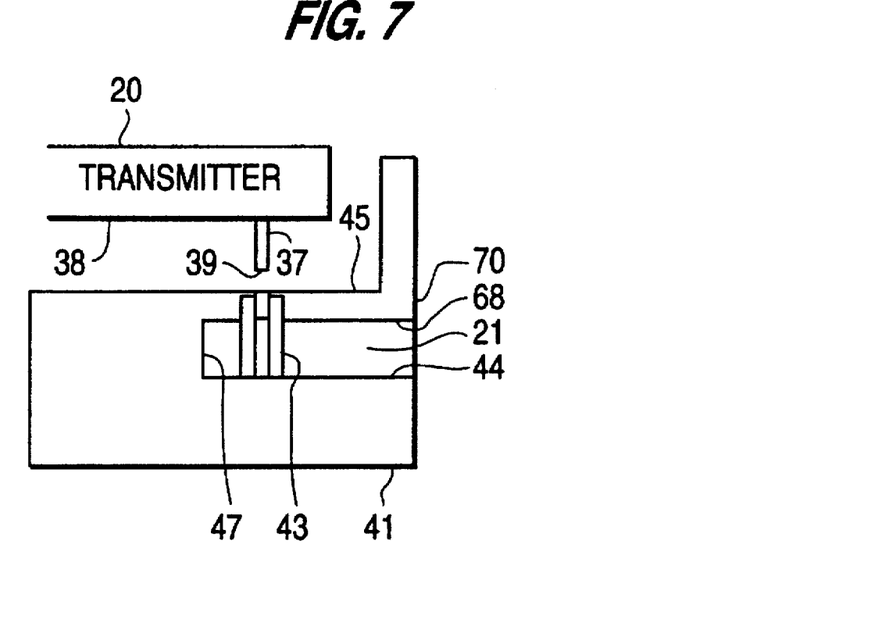
FIG. 7 illustrates an exploded view of the transmitter module positioned to be installed in the lower housing of the outdoor unit of the present invention.
Figure 8:
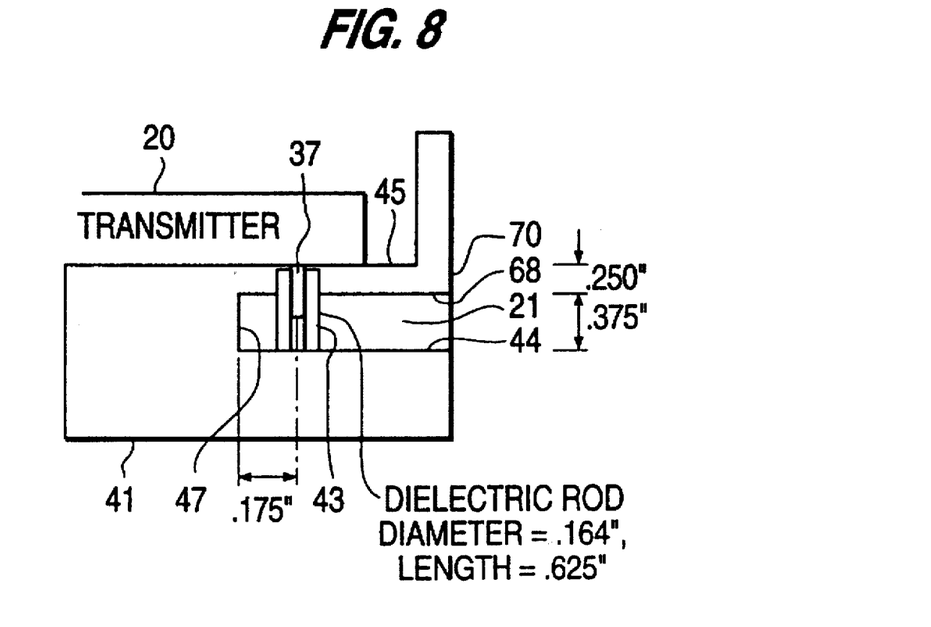
FIG. 8 illustrates an exploded view of the transmitter installed in the lower housing of the outdoor unit of the present invention.

Turning to FIG. 4, the output of the transmitter module 20 is coupled to an rf feed-through 37, referred to as a probe. As shown in FIG. 4, this probe 37 extends downwardly from the transmitter module 20, orthogonally to the bottom surface 38 of the module 20. The first end of the probe 37 (not shown), which is internal to the transmitter module 20, is coupled to the output of the amplifier 36. In one embodiment, this coupling comprises a shielded wire suitable for transferring the carrier signal having one end connected to the amplifier 36 output and the other end connected to the probe 37. The second end 39 of the probe 37 extends into a waveguide 21 disposed in a lower housing 41 of the outdoor unit 14, as shown in FIGS. 6–8.

Referring to FIG. 4, the transmitter module 20 also comprises input pins 66 for receiving DC power, a control line input pin 65 and an rf connector 67 for receiving the output of the main transmit module 24 extending from the bottom surface 38 of the transmitter module 20.

Figure 5:
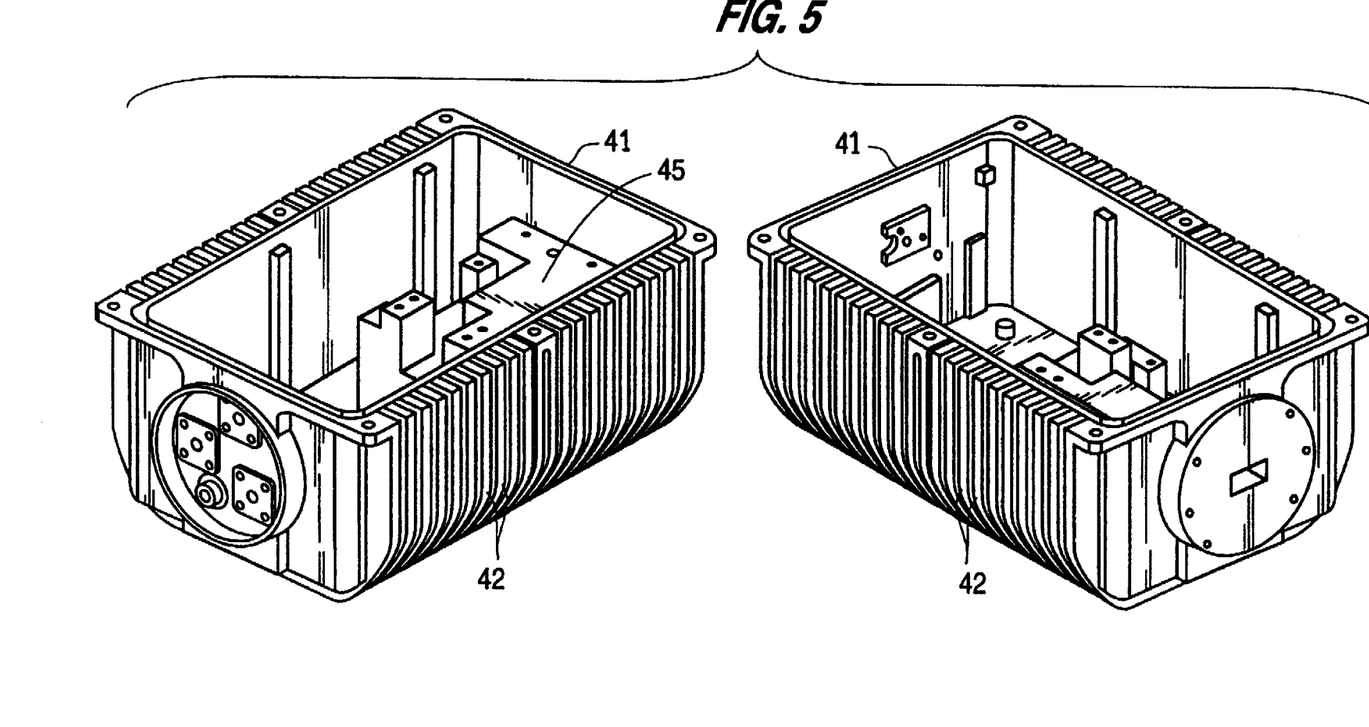
FIG. 5 is a drawing illustrating the lower housing of the outdoor unit of the present invention.

The housing of the outdoor unit 14 comprises an upper and lower housing, which are mated together to form the shell of the outdoor unit 14. FIG. 5 illustrates the lower housing 41 of the outdoor unit 14, viewed from opposite ends. Typically, both the upper and lower housing are made of metal and comprise a plurality of heat sinks 42 disposed on the outer surfaces thereof to dissipate the heat generated by the transmitter module 20 and the other components contained in the outdoor unit 14. The waveguide 21 is formed as an integral part of the lower housing 41.

Figure 6:
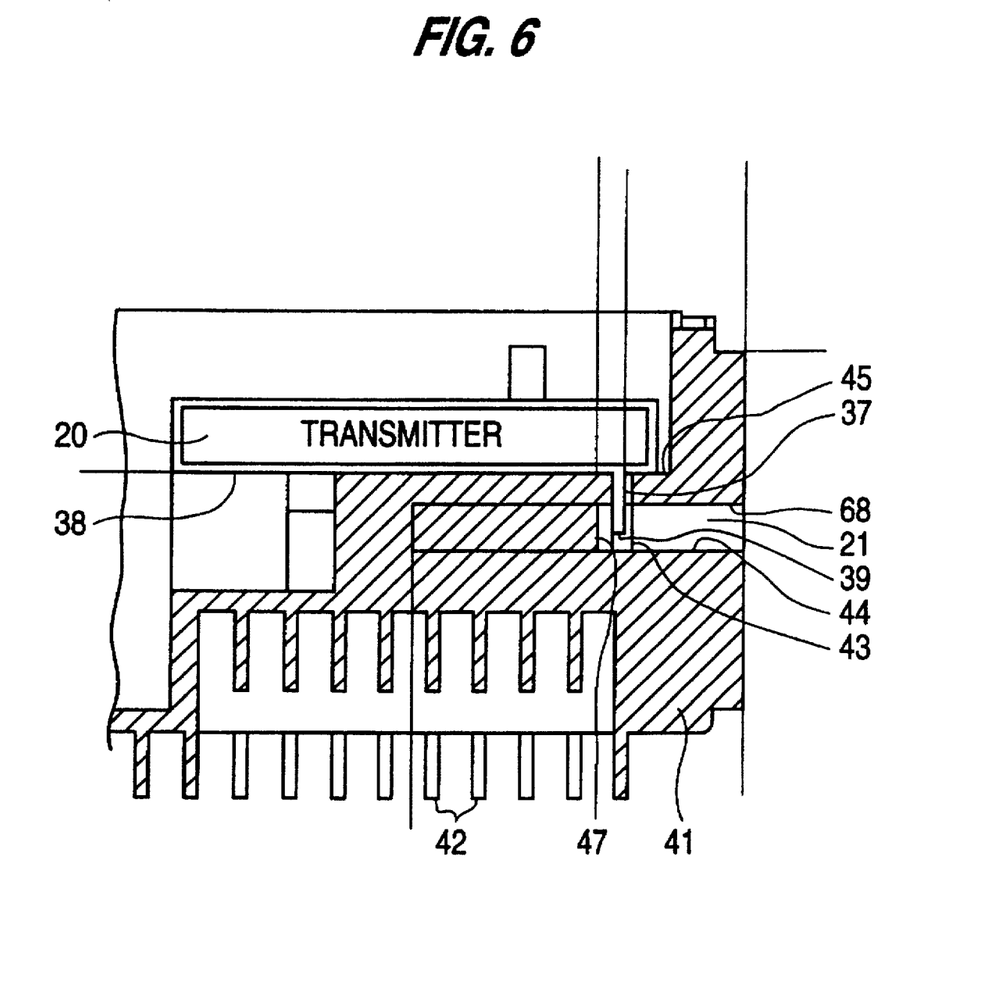
FIG. 6 is a cross sectional drawing of the lower housing of the outdoor unit of the present invention illustrating the interconnection between the lower housing and the transmitter module.

FIG. 6 is a cross-sectional view of a portion of the lower housing 41 of the outdoor unit 14 with the transmitter module 20 installed therein. As shown in FIG. 6, the lower housing 41 comprises the waveguide 21 having a rectangular shape which extends parallel to the bottom surface 38 of the transmitter module 20. The waveguide 21 has a longitudinal plane which is also parallel to the bottom surface 38 of the transmitter module 20. The waveguide 21 extends to a side of the lower housing 41. The TRIA assembly 26 (not shown), which is also a waveguide assembly, is mounted to the side of the lower housing 41 at the opening of the waveguide 21. In the first embodiment, the waveguide 21 formed is a WR-75 Ku band waveguide.

The lower housing 41 further comprises a dielectric rod 43 having a hollow center which is disposed in the waveguide 21. The dielectric rod 43, which can be formed from TEFLON, functions to locate the probe 37 extending from the transmitter module 20 in the proper location. The dielectric rod 43 is orthogonal to the longitudinal plane of the waveguide, and extends from the bottom surface 44 of the waveguide 21 through the portion of the lower housing forming the upper surface 68 of the waveguide 21 so as engage the bottom surface 38 of the transmitter module 20.

During assembly, the probe 37 is inserted into the dielectric rod 43 until the bottom surface 38 of the transmitter module 20 is flush with an upper surface 45 of the lower housing 41 forming the waveguide 21. The transmitter module 20 is then secured to the lower housing 41. As seen from FIG. 6, the transmitter module 20 extends over a portion of the waveguide 21. Once assembled, both the probe 37 and the dielectric rod 43 are orthogonal to the bottom surface 38 of the transmitter module 20 and the longitudinal plane of the waveguide 21.

During operation, the probe 37 functions to transfer the modulated carrier signal output by the amplifier 36 of the transmitter module 20 to the waveguide 21. The modulated carrier signal is then coupled to the TRIA assembly 26 via the waveguide 21, and subsequently to the antenna 12 which is coupled to the output of the TRIA assembly 26 via a feedhorn 27.

FIGS. 7 and 8 provide an exploded view of the interconnection between the transmitter module 20 and the lower housing 41 of the outdoor unit 14. Specifically, FIG. 7 illustrates the transmitter module 20 positioned to be installed in the lower housing 41, while FIG. 8 illustrates the transmitter module 20 installed. As shown in FIGS. 7 and 8, during installation, the probe 37 which extends downwardly from the transmitter module 20 is positioned directly above the dielectric rod 43 disposed in the waveguide 21. The transmitter module 20 is then lowered such that the probe 37 enters the center of the dielectric rod 43. The transmitter module 20 is then lowered further until the bottom surface 38 of the transmitter module 20 is flush with the upper surface 45 of the lower housing 41.

The dimensions of the probe 37 and the waveguide 21 vary in accordance with the frequency of the modulated carrier signal to be transmitted. The dimensions of the components illustrated in FIGS. 7 and 8 allow for the transfer of a modulated carrier signal in the Ku frequency band (i.e., 14.0 Ghz to 14.5 Ghz).

Referring to FIGS. 4, 7 and 8, the probe 37 has a diameter of 0.050 inches, and a length of 0.375 inches. The upper wall 70 of the waveguide 21 has a height of 0.250 inches. The height of the waveguide opening is 0.375 inches. The dielectric rod 43 has a height of 0.625 inches and is positioned along the longitudinal axis of the waveguide 21 such that the probe 37 is 0.175 inches from the rear wall 47 of the waveguide 21. The length of the waveguide 21 is variable in accordance with manufacturing requirements.

Accordingly, for transmission in the 14.0–14.5 Ghz frequency band, the two critical dimensions are that the probe 37 extends 0.125 inches into the waveguide 21, and that the probe 37 is positioned 0.175 inches from the rear wall 47 of the waveguide 21. The output of the waveguide 21 is coupled to the TRIA assembly 26 which functions to couple the modulated carrier signal to the antenna 12 via a feedhorn 27. The modulated carrier signal is then transmitted to the satellite 4.

The orthogonal waveguide transition of the present invention provides numerous advantages. For example, the present invention eliminates the need for an additional cable to connect the transmitter module with the waveguide coupled to the TRIA assembly. This minimizes the power losses associated with coupling the output of the transmitter module to the waveguide. As a result, the power rating of the amplifier of the transmitter module can be reduced thereby reducing the cost of the transmitter module. The present invention also eliminates the cost associated with the additional cable and the connectors, thereby further reducing the overall cost of the outdoor unit.

Another advantage is that the transmitter module mounts directly (i.e., flush) with a surface which is integral with the heat dissipating surface of the outdoor unit, thereby increasing the efficiency of the heat dissipation of the outdoor unit.

Numerous variations of the foregoing invention are also possible. For example, while the dimensions and operational frequencies described above relate to a unit designed to operate in the Ku frequency band, the foregoing invention can be utilized in units operating in various frequency bands, such as the C band.

Of course, it should be understood that a wide range of other changes and modifications can be made to the preferred embodiment described above. It is therefore intended that the foregoing detailed description be regarded as illustrative rather than limiting and that it be understood that it is the following claims, including all equivalents, which are intended to define the scope of the invention.

What is claimed is:

1. An apparatus for transmitting a modulated carrier signal to a satellite, said apparatus comprising:

an input port for receiving a modulated data signal;

a housing having an upper portion and a lower portion, said lower portion of said housing comprising a waveguide;

a transmitter module for amplifying and multiplying said modulated data signal so as to produce said modulated carrier signal, said transmitter module being mounted in said lower portion of said housing so as to be positioned above at least a portion of said waveguide; and a probe having a first and second end, said first end disposed in said transmitter module and receives said modulated carrier signal generated by said transmitter module, said second end extending from a lower surface of said transmitter module into said waveguide;

wherein said probe is operative to couple said modulated carrier signal directly into said waveguide disposed in said lower portion of said housing.

2. The apparatus of claim 1, wherein said waveguide disposed in said lower portion of said housing comprises a substantially rectangular shape, and extends substantially parallel to the lower surface of the transmitter module.

3. The apparatus of claim 2, wherein said lower portion of said housing comprises a dielectric rod having a hollow center which is disposed in said waveguide and extends upwardly through said lower portion of said housing so as to engage said lower surface of said transmitter module, said probe positioned in the hollow center of said dielectric rod operative.

4. The apparatus of claim 3, wherein said dielectric rod comprises Teflon.

5. The apparatus of claim 1, wherein said probe is orthogonal to said lower surface of said transmitter module and to the longitudinal plane of said waveguide disposed in said lower portion of said housing.

6. The apparatus of claim 1, wherein said lower portion of said housing is formed such that said waveguide is an integral part of said lower portion of said housing.

7. The apparatus of claim 6, wherein said waveguide formed as an integral part of said housing is a WR-75 Ku band waveguide.

8. The apparatus of claim 1, wherein said upper and lower portions of said housing comprise a plurality of heat sinks disposed on an outer surface of said upper and lower portions of said housing.

9. The apparatus of claim 8, wherein said lower surface of said transmitter module is mounted flush with a surface of said lower portion of said housing which is integral with said plurality of said heat sinks.

10. A method for coupling a modulated carrier signal generated by a transmitter module to an antenna comprising:

forming an outdoor unit having an upper portion and a lower portion, said lower portion of said outdoor unit comprising a waveguide;

mounting said transmitter module in said lower portion of said outdoor unit so as to be positioned above at least a portion of said waveguide; and connecting a probe having a first and second end between said transmitter module and said waveguide, said first end of said probe being disposed in said transmitter module and coupled to an output of said transmitter module so as to receive said modulated carrier signal, said second end of said probe extending from a lower surface of said transmitter module into said waveguide;

wherein said probe is operative to couple said modulated carrier signal directly into said waveguide disposed in said lower portion of said outdoor unit.

11. The method of claim 10, wherein said waveguide disposed in said lower portion of said outdoor unit comprises a substantially rectangular shape, and extends substantially parallel to the lower surface of the transmitter module.

12. The method of claim 11, further comprising disposing a dielectric rod having a hollow center in said waveguide, said dielectric rod extending upwardly through said lower portion of said housing so as to engage said lower surface of said transmitter module, said dielectric rod operative to locate said probe in the proper position during assembly.

13. The method of claim 12, wherein said dielectric rod comprises Teflon.

14. The method of claim 10, wherein said probe is orthogonal to said lower surface of said transmitter module and to the longitudinal plane of said waveguide disposed in said lower portion of said outdoor unit.

15. The method of claim 10, wherein said lower portion of said outdoor unit is formed such that said waveguide is an integral part of said lower portion of said outdoor unit.

16. The method of claim 15, wherein said waveguide formed as an integral part of said outdoor unit is a WR-75 Ku band waveguide.

17. The method of claim 10, further comprising forming a plurality of heat sinks on an outer surface of said upper and lower portions of said outdoor unit.

18. The method of claim 17, wherein said lower surface of said transmitter module is mounted flush with a surface of said lower portion of said housing which is integral with said plurality of said heat sinks.

* * * * *